United States Patent [19]

Motoki

[11] 4,084,980

[45] Apr. 18, 1978

[54] PROCESS FOR PREPARING A FOAMED BODY

[75] Inventor: Hideo Motoki, Ibaragi, Japan

[73] Assignee: Shikoku Kaken Kogyo Kabushiki Kaisha, Japan

[21] Appl. No.: 715,502

[22] Filed: Aug. 18, 1976

[30] Foreign Application Priority Data

Dec. 26, 1975 Japan .................. 50-157139
Dec. 27, 1975 Japan .................. 50-158197
Dec. 27, 1975 Japan .................. 50-158198
Dec. 27, 1975 Japan .................. 50-158199

[51] Int. Cl.$^2$ .................. C04B 7/00; C04B 21/02
[52] U.S. Cl. .................. 106/75; 106/87
[58] Field of Search .................. 106/75, 87, 40 R

[56] References Cited

U.S. PATENT DOCUMENTS

| | | | |
|---|---|---|---|
| 3,729,328 | 4/1973 | Magder | 106/87 |
| 3,856,539 | 12/1974 | Mallow et al. | 106/75 |
| 3,944,425 | 3/1976 | Magder | 106/87 |
| 3,961,972 | 6/1976 | Sparlin et al. | 106/75 |

*Primary Examiner*—J. Poer
*Attorney, Agent, or Firm*—Larson, Taylor and Hinds

[57] ABSTRACT

A process for preparing a foamed body comprising a step of mixing the four components of:
 a. an aqueous solution having a pH of up to 2.0 and containing at least one of acids and water-soluble acidic phosphates,
 b. at least one of cement materials and anhydrous alkali metal silicates,
 c. a metal blowing agent, and
 d. a foaming stabilizer to obtain a pasty mixture, the acids having an electric dissociation constant (pKa) of up to 4.0 at 25° C, the foaming stabilizer being at least one member selected from the group consisting of activated carbon, zeolite, silica gel, carbon black, talc and mica.

14 Claims, No Drawings

PROCESS FOR PREPARING A FOAMED BODY

This invention relates to a process for preparing inorganic foamed bodies, and more particularly to a process for preparing inorganic foamed bodies from alkali silicates or cement materials.

It is well known that inorganic foamed bodies can be produced from alkali silicates or cement materials. Various processes heretofore proposed in which alkali silicates are used all involve foaming by heating. These processes include a process in which an aqueous solution of alkali silicate is foamed directly by heating, another process comprising preparing an aqueous solution of alkali silicate containing a blowing agent which gives off a gas on heating, solidifying the solution and thereafter foaming the solid mass by heating, and another process in which an aqueous solution of alkali silicate containing a hardening agent (usually silicofluoride, triphosphate or the like) is hardened and foamed at the same time by heating. Thus foaming by heating is essential to any of these processes; in fact with these processes foaming hardly takes place without heating. The foamed bodies prepared from alkali silicates have extremely low water resistance since the alkali component is very liable to dissolve out and, when the alkali component has dissolved out, the foamed body exhibits greatly reduced mechanical strength due to the resulting strain.

Various processes are also known for producing foamed bodies from cement materials. For example, it is known to produce lightweight concrete merely by adding to cement a lightweight aggregate such as perlite, foamed silica or the like. The known processes further include a process comprising adding metal aluminum to cement with water to produce hydrogen gas and heating the mixture in an autoclave at increased pressure to effect hydration for hardening, and another process comprising adding surfactant or animal protein to cement, foaming the mixture by stirring and hardening the foamed mass. With these processes, however, foaming and hardening steps require a prolonged period of time. Especially the hardening step usually takes about one week. With the known processes for producing foamed bodies from cement, it is difficult to obtain lightweight products. Even the most lightweight product has a bulk density of about 0.5 g/cm$^3$, and it is entirely impossible to prepare those having low bulk densities of about 0.1 to about 0.4 g/cm$^3$.

An object of this invention is to provide a process for preparing inorganic foamed bodies of the alkali silicate or cement type at room temperature without requiring any heating.

Another object of this invention is to provide a process for preparing foamed bodies of the alkali silicate type having high water resistance and excellent mechanical strength.

Another object of this invention is to provide a process for preparing foamed bodies of the cement type which takes only a very short period of time for foaming and hardening.

Still another object of this invention is to provide a process for preparing foamed bodies of the cement type having a low bulk density of about 0.1 to about 0.4 g/cm$^3$.

Other objects of this invention will become apparent from the following description.

The present invention provides a novel process for preparing a foamed body characterized by mixing together the four components of (a) an aqueous solution having a pH of up to 2.0 and containing at least one of acids and water-soluble acidic phosphates, (b) at least one of cement materials and anhydrous alkali metal silicates, (c) a metal blowing agent, and (d) a foaming stabilizer to obtain a pasty mixture. The acids should have an electric dissociation constant (pKa) of up to 4.0 at 25° C. The foaming stabilizer is at least one member selected from the group consisting of activated carbon, zeolite, silica gel, carbon black, talc and mica.

One of the most outstanding features of the present process is that the desired foamed body can be easily obtained at room temperature at atmospheric pressure merely by mixing the four components (a) to (d) into a pasty mass without any necessity of subsequently heating the resulting mixture. The second of the moxt outstanding features of the present process is that the very simple procedure of preparing the pasty mixture gives a very lightweight inorganic foamed body having high water resistance, excellent mechanical strength and a small bulk density of about 0.1 to about 0.4 g/cm$^3$.

The aqueous solution of at least one of acids and water-soluble acidic phosphates to be used in this invention must have a pH of up to 2.0. The useful acids should have an electric dissociation constant (pKa) of up to 4.0, preferably 0.3 to 1.5, at 25° C. The term "electric dissociation constant" (pKa) herein used refers to a value expressed by-log$_{10}$Ka. Preferably pH is up to 1.5.

According to this invention, both inorganic acids and organic acids are usable insofar as they have an electric dissociation constant of up to 4.0. Examples are inorganic acids such as hydrochloric acid, sulfuric acid, sulfurous acid, nitric acid, nitrous acid, phosphoric acid, phosphorous acid, hypophosphorous acid, chromic acid, arsenic acid, hydrofluoric acid, iodic acid, chlorous acid, etc., organic acids such as formic acid, glycolic acid, chloroacetic acid, cyanoacetic acid, dichloroacetic acid, trichloroacetic acid, pyruvic acid and like aliphatic monocarboxylic acids, oxaloacetic acid, citric acid, oxalic acid, α-tartaric acid, fumaric acid, maleic acid, malonic acid and like aliphatic polycarboxylic acids, aspartic acid, asparagine, alanine, isoleucine, ornithine, glycine, glutamine, glutamic acid, valine, lysine, leucine and like amino acids. Amine halides such as chloroamine, dichloroethylenediamine, etc. are also usable. Among these acids, inorganic acids such as hydrochloric acid, sulfuric acid, sulfurous acid, nitric acid, nitrous acid, phosphoric acid, chromic acid are preferable. With use of acids having an electric dissociation constant of above 4.0, it becomes difficult to obtain a foamed body. The phosphates to be used in this invention are water-soluble acidic phosphates such, for example, as acidic aluminum orthophosphate, acidic zinc orthophosphate, acidic copper orthophosphate, acidic iron orthophosphate, acidic nickel orthophosphate, acidic chromium orthophosphate, acidic calcium orthophosphate, acidic magnesium orthophosphate, acidic zinc pyrophosphate, acidic thallium pyrophosphate, etc., among which acidic aluminum orthophosphate is most preferable. These acids and/or acidic phosphates must be used in the form of an aqueous solution having a pH of not higher than 2.0. If the aqueous solution has a pH of above 2.0, the foamed body obtained will possess greatly reduced water resistance and low mechanical strength.

Further in the present invention cement materials and anhydrous alkali metal silicates are used. The cement materials are materials consisting predominantly of at least one compound selected from the group consisting of oxides and composite oxides of alkaline earth metals, hydroxides of Groups I, II, III, IV and VIII of Periodic Table, composite hydroxides of alkaline earth metals, and aluminates, silicates, borates and stannates of alkaline earth metal oxides. Preferable examples of the oxides of alkaline earth metals are CaO, MgO, BaO, etc., preferably examples of the composite oxides thereof include CaO.MgO, those of the hydroxides are Ca(OH)$_2$, Mg(OH)$_2$ and Ba(OH)$_2$, and those of the composite hydroxides include Ca(OH)$_2$.Mg(OH)$_2$. Preferable examples of the aluminates of alkaline earth metal oxides are CaO.Al$_2$O$_3$ and MgO.Al$_2$O$_3$, those of the silicates thereof are CaO.SiO$_2$ and MgO.SiO$_2$, and those of borates and stannates thereof include CaO.B$_2$O$_3$, MgO.B$_2$O$_3$, CaO.SnO$_2$, etc. In this invention it is especially preferable to use aluminates or silicates of alkaline earth metals. Specific examples of the cement materials are air setting cements such as quick lime, slaked lime, dolomite plaster, magnesia cement, etc., hydraulic cements such as hydraulic lime (calcium silicate), portland cement, alumina cement, lime alumina cement, lime slag cement, portland blast furnace cement, silica cement, fly ash cement, high sulfate slag cement, etc., magnesium silicate, calcium borate, calcium stannate, magnesia, etc. These cement materials may contain up to about 10% by weight of Fe$_2$O$_3$, TiO$_2$, Na$_2$O, etc. as impurities.

The alkali metal silicates to be used in this invention are anhydrous alkali silicates. Hydrous alkali silicates, if used, will react with the component (a) too rapidly, consequently entailing substantial difficulty in obtaining foamed bodies. Useful anhydrous alkali metal silicates are those substantially free from crystal water, typical of which is so-called water glass cullet which is prepared by melting siliceous sand and an alkali metal by heating for vitrification. Depending on the kind of the alkali metal, the water glass cullet is represented by Na$_2$O.$n$SiO$_2$ or K$_2$O.$n$SiO$_2$ wherein $n$ is preferably 2.0 to 4.0 for use in this invention. The water glass cullet must be used as finely divided into particles of the smallest possible size. Usually the preferred particle sizes are not greater than 150 microns.

With the present invention, the cement material and anhydrous alkali metal silicate are usable singly or conjointly.

The metal blowing agents usable in this invention are materials capable of producing hydrogen gas by reacting with acids. Typical examples are metal elements and alloys. A wide variety of metal elements are useful which include those of Groups IB, IIA, IIB, IIIA, IIIB, IVA, IVB, VA, VB, VIA, VIIB and VIII of the Periodic Table, among which elements in the third to fifth periods are preferable. Exemplary of such preferable metal elements are Mg, Ca, Cr, Mn, Fe, Co, Ni, Cu, Zn, Al, Ga, Sn, Sb, etc. Especially preferable are Al, Zn and like amphoteric metals. The metal elements usable in this invention further include B and Si. The useful alloys include metal alloys and intermetallic compounds such as Al-Si, Al-Ti, Al-Mn, Al-Cu-Si, Al-Cu, Zn-Sn, Zn-Fe, Cu-Sn, Cu-Si, Cu-Pb, Cu-Ni, Fe-Mn, Fe-Ni, Fe-Cr, Fe-Si, Si-Ni, Co-Sb and Mn-Ag alloys, among which preferable are those containing an amphoteric metal such as Fe-Si, Al-Si.

The foaming stabilizer to be used in this invention is at least one of silica gel, zeolite, carbon black, activated carbon, talc and mica. As the zeolite, both natural and artificial zeolites are usable. Use of such foaming stabilizer ensures uniform foaming, leading to the production of foamed bodies of uniform quality.

The foamed bodies of this invention can be prepared by mixing the four components (a) to (d) into a pasty mass. The proportions of the four components are suitably determined depending on the kinds of the four components, especially on the kind of the component (a), the bulk density of the desired foamed product, etc. Generally the proportions are 100 parts by weight of at least one of the cement materials and anhydrous alkali metal silicates as the component (b) calculated as a metal oxide M$_2$O or M'O (wherein M is alkali metal and M' is alkaline earth metal), about 10 to about 400 parts by weight, preferably about 20 to about 300 parts by weight, of the aqueous acid and/or acidic phosphate solution as the component (a), about 0.5 to about 30 parts by weight, preferably about 1.0 to about 5.0 parts by weight, of the metal blowing agent as the component (c), and about 3 to about 50 parts by weight, preferably about 5 to about 10 parts by weight, of the foaming stabilizer as the component (d). Since the aqueous acid and/or acidic phosphate solution, the component (a), should have a pH of up to 2.0 the concentration of the aqueous solution invariably has a lower limit, and the amount of the acid and/or phosphate is therefore substantially limited. If the amount of the component (a) is too small, sufficient foaming will not take place, whereas if it is too excess, it becomes difficult to obtain a pasty mixture and the resulting product tends to have reduced water resistance and lower compression strength. Further when the blowing agent, the component (c), is used in too small an amount, insufficient foaming will result, giving a product of increased bulk density. Conversely excess amounts tend to enlarge a cell size of the final foamed bodies. At the result the final foamed bodies lack unity in thier cell sizes and become poor in mechanical strength and heat-resistance. When the amount of the foaming stabilizer, the component (d), is too small, uneven foaming occurs, making it difficult to obtain a uniformly foamed product, whereas if it is too great, the pasty mass of the four components can not be easily produced and is difficult in foaming. At the result the final foamed product tends to shrink easily and to be poor in mechanical strength.

The four components may be mixed together by any method insofar as a pasty mixture is obtained by mixing. They can be mixed together by, for example, mechanical stirring, kneading, centrifugal mixing, spraying, shaking, etc. The four components may be mixed together at the same time, or the three components (b) to (d) may be mixed together first and the resulting mixture may then be admixed with the component (a).

The foaming mechanism involved in the present process, although remaining yet to be fully clarified, is presumably as follows. The aqueous solution of acid and/or acidic phosphate, the component (a), reacts with the metal blowing agent, the component (c), in the presence of the cement material and/or anhydrous alkali metal silicate, the component (b), with the result that while evolving hydrogen gas, the mixture hardens. The foaming and hardening proceed ingeniously in unison, permitting the mixture to complete hardening while enclosing the evolved hydrogen gas to give a foamed body of substantially closed cellular structure. The specified foaming stabilizer, conjointly present as the component (d), acts to distribute the evolved hydrogen gas uniformly throughout the mass, thereby aiding in the formation of a uniform foamed body.

According to this invention, it is critical that the four components be made into a pasty mixture. Unless in the form of a pasty mixture, the mixture will not foam satisfactorily. By the term "pasty" is meant a soft and viscous mass of solids dispersed in liquid. The pasty mixture of the present invention has a viscosity of about 0.5 to about 300 poise at 25° C by a rotation viscometer.

When the components are formulated into a pasty mixture, foaming takes place usually in about 5 to about 30 minutes, and the mixture completely hardens generally within 24 hours.

In the present invention, at least one species selected from the additives consisting of gypsum, water-soluble resinous materials, aggregates and inorganic fibrous materials may be used conjointly with the above four components (a) to (d) in order to increase mechanical strength of the final foamed body. Usually gypsum is used in an amount of 0.5 to 20 weight % based on the component (b) and examples thereof are $CaSO_4$, $CaSO_4 \cdot \frac{1}{2}H_2O$ and $CaSO_4 \cdot 2H_2O$. Water-soluble resinous materials used in the present invention are such, for example, as carboxymethyl cellulose, carboxyethyl cellulose, sodium salt of polyacrylic acid, polyethyleneoxide, polyvinylalcohol. The resinous material is used in an amount of 0.5 to 20% by weight based on the component (b). Preferable examples of inorganic fibrous materials are glass fiber, rock wool, asbestos, etc. Examples of aggregates are powder of refractory such as chamotte, light-weight aggregate such as perlite. The inorganic fibrous material or aggregate is used in an amount of 0.5 to 20% by weight based on the component (b). Among these additives gypsum is most preferable.

The process of this invention has the following features:

1. Inorganic foamed bodies can be produced merely by mixing the four components to a pasty form at room temperature without any necessity of subsequently heating the mixture. The process is therefore very advantageous for an industrial operation.

2. Because the foaming and hardening reaction proceed very rapidly, completely hardened foamed bodies can be obtained within 24 hours after mixing.

3. The pasty starting mixture gives a foamed body of any desired shape, because the mixture can be readily poured into a mold of complex shape. Further because the mixture has a relatively low foaming pressure, molds of simple construction, such as those made of corrugated cardboard, can be employed. Such mold may be suitably partitioned, and the mixture poured into the desired division. The pasty mixture, which is thus usable in situ, is especially useful in filling in narrow clearances and cracks.

4. Foamed bodies of varying degrees of foaming are available simply by altering the proportions of the four components (a) to (d).

The inorganic foamed bodies prepared by the present process are substantially in the form of a closed cellular body, by which is meant that the body has hygroscopicity of up to 2 wt. % when tested for hygroscopicity according to JIS A-1161. The low hygroscopicity of up to 2 wt. % indicates that the foamed bodies hardly absorb water, because the cells of the foamed bodies are out of communication with the atmosphere. In fact when a section of the foamed body of this invention is observed with the unaided eye, it is seen that each cell is completely separated from, and held out of communication with, adjacent cells by a partition. The cells contained in the foamed body have a substantially uniform size, which may generally vary from body to body in the range from about 0.5 to about 10 mm in diameter.

The table below shows the properties of the foamed body prepared by the process of this invention in comparison with those of conventional foamed bodies.

|  | This invention | Conventional foamed body | | |
|---|---|---|---|---|
|  |  | Water glass foamed body | Foamed mortar | ALC*** |
| Bulk density (g/cm³) | 0.1–0.4 | 0.05–0.2 | At least 0.6 | At least 0.4 |
| Foaming time (min) | 5–30 | About 1 | At least 30 | 5–30 |
| Hardening time | About 1 day | Immediately after foaming | At least 1 week | Requires steam curing |
| Cell size (diameter) (mm) | 0.5–10 | — | At least 2 | At least 2 |
| Compression strength (kg/cm²) |  |  |  |  |
| (1)* | 1.0–3.5 | Up to 1.0 | — | — |
| (2)** | 10–30 | Up to 2.0 | — | Up to 20 |
| Water resistance | No change in 10 days | Dissolved out | No change | No change (hygroscopicity: 40–45%) |
| Acid resistance | No change in 2 days | " | " | No change |
| Alkali resistance | " | " | Dissolved out | Dissolved out |
| Thermal conductivity (Kcal/m.hr. ° C) | 0.05–0.15 | 0.05–0.20 | At least 0.15 | 0.10–0.30 |
| Heat resistance | Stable at 500° C | Embrittled at 500° C | Embrittled at 500° C | Embrittled at 500° C |
| Flame resistance | No cracking for 10 sec. | Melted | Fairly good | Fairly good |

Notes:
*When the bulk density is 0.1 g/cm³.
**When the bulk density is 0.4 g/cm³, but that of water glass foamed body is 0.2 g/cm³.
***ALC stands for foamed concrete which has been cured at pressure of about 10 kg/cm² G at about 180° C.

Tables 1 to 4 give the substances to be used as the components (a) to (d) in the examples.

Table 1

| Acidic aqueous solution (component (a)) | | | | |
|---|---|---|---|---|
| Acid No. | pka (25° C) | pH (25° C) | Acid | Preparation procedure |
| A101 | −2.0 | 1.1 | $H_2SO_4$ | Add water to 5.2 g of 95% sulfuric acid to prepare 1 l of solution. |
| A102 | −1.7 | 0.8 | HCl | Add water to 10.4 g of 35% hydrochloric acid to prepare 1 l of solution. |
| A103 | −1.4 | 0.3 | $HNO_3$ | Add water to 52.5 g of 60% nitric acid to prepare 1 l of solution. |

Table 1-continued

| | Acidic aqueous solution (component (a)) | | | |
|---|---|---|---|---|
| Acid No. | pka (25° C) | pH (25° C) | Acid | Preparation procedure |
| A104 | −1.0 | 0.3 | $H_2CrO_4$ | Add water to 50.0 g of chromic anhydride to prepare 1 l of solution. |
| A105 | 0.64 | 0.9 | Trichloroacetic acid | Add water to 16.5 g of 99% trichloroacetic acid to prepare 1 l of solution. |
| A106 | 1.3 | 0.6 | Oxalic acid | Add water to 63.1 g of oxalic acid to prepare 1 l of solution. |
| A107 | 1.9 | 0.6 | Maleic acid | Add water to 116.1 g of maleic acid to prepare 1 l of solution. |
| A108 | 2.1 | 0.7 | $H_3PO_4$ | Add water to 115.3 g of 85% phosphoric acid to prepare 1 l of solution. |
| A109 | 2.8 | 1.1 | Malonic acid | Add water to 104.1 g of malonic acid to prepare 1 l of solution. |
| A110 | 3.1 | 1.2 | Citric acid | Add water to 210.2 g of citric acid to prepare 1 l of solution. |
| A111 | — | 0.6 | $H_2SO_4$ + oxalic acid | Add 5.2 g of 95% sulfuric acid and 31.6 g of oxalic acid to water to prepare 1 l of solution. |
| A112 | 3.8 | 1.4 | Formic Acid | Add water to 46.0 g of formic acid to prepare 1 l of solution. |

Table 2

| | Acidic aqueous solution (component (a)) | |
|---|---|---|
| Salt No. | Acidic phosphate | Concn. (wt. % of solids) |
| B101 | Aluminum orthophosphate | 40 |
| B102 | Aluminum orthophosphate + zinc orthophosphate (1:1) | 40 |
| B103 | Magnesium orthophosphate + zinc orthophosphate (1:1) | 25 |
| B104 | Zinc pyrophosphate | 25 |

Table 3

| | Basic powder (component (b)) | | |
|---|---|---|---|
| Powder No. | Substance | $SiO_2/R_2O$* mole ratio | Particle size (μ) |
| C201 | Sodium silicate | 3.2 | 40–150 |
| C202 | Sodium silicate | 2.1 | 40–150 |
| C203 | Potassium silicate | 3.1 | 40–150 |
| C204 | Sodium silicate + potassium silicate (1:1) | 3.1 | 40–150 |

*R: Na or K

Table 4

| | Basic powder (component (b)) | | |
|---|---|---|---|
| Powder No. | Substance | Formula (main component) | Particle size (μ) |
| D201 | Alumina cement | $CaO \cdot Al_2O_3$ | 30–75 |
| D202 | Quick lime | CaO | 1–50 |
| D203 | Slaked lime | $Ca(OH)_2$ | " |
| D204 | Magnesia | MgO | " |
| D205 | Dolomite plaster | $Ca(OH)_2 \cdot Mg(OH)_2$ | 10–100 |
| D206 | Calcium silicate | $CaO \cdot SiO_2$ | " |
| D207 | Blast furnace slag powder | $2CaO \cdot SiO_2$ | " |
| D208 | Portland cement | $3CaO \cdot SiO_2$ | 5–100 |
| D209 | Alumina cement | $12CaO \cdot 7Al_2O_3$ | " |
| D210 | Magnesium silicate | $2MgO \cdot 3SiO_2$ | 10–100 |
| D211 | Calcium borate | $Ca_3(B_2O_3)_2$ | " |
| D212 | Calcium stannate | $CaO \cdot SnO_2$ | " |

Table 5

| | Metal blowing agent (component (c)) | |
|---|---|---|
| Agent No. | Metal | Particle size (μ) |
| 301 | Al | 1 – 50 |
| 302 | Al + Al — Si (1 : 1) | 1 – 50+ / 10 – 100 |
| 303 | Zn | 10 – 100 |
| 304 | Ga + Mn — P (1 : 1) | 1 – 50+ / 5 – 100 |
| 305 | Fe — Si + Al — Ti (1 : 1) | 5 – 100+ / 5 – 100 |
| 306 | Ca | 1 – 50 |
| 307 | Al — Cu | 5 – 100 |
| 308 | Cu — Ni | " |
| 309 | Mg — Ag | " |

Table 6

| | Foaming stabilizer (component (d)) | |
|---|---|---|
| Stabilizer No. | Substance | Particle size (μ) |
| 401 | Activated carbon | 5 – 50 |
| 402 | Zeolite | 10 – 100 |
| 403 | Silica gel | 10 – 150 |
| 404 | Carbon black | 1 – 10 |
| 405 | Talc | 10 – 150 |
| 406 | Mica | 20 – 200 |

The specimens of inorganic foamed bodies obtained in the examples are tested for various properties by the following methods in an atmosphere at 20 ± 2° C and RH of 65 ± 10%.

A. Bulk density: According to JIS A-1161.

B. Hygroscopicity: According to JIS A-1161, expressed in terms of % by weight.

C. Compression strength: According to JIS A-1161, expressed in terms of kg/cm².

D. Water resistance: The specimens are immersed in water for 10 days and thereafter checked for changes in the appearance. The specimens which are found to be free of any changes are evaluated as "−", and those involving some change are evaluated as "+".

E. Acid resistance: The specimens are immersed in a 1N HCl solution for 2 days and thereafter checked for changes in the appearance. Those free of any changes are evaluated as "−", and those having some changes are evaluated as "+".

F. Alkali resistance: The specimens are immersed in a saturated $Ca(OH)_2$ solution for 2 days and thereafter checked for changes in the appearance. Those free of any changes are evaluated as "−", and those having some change are evaluated as "+".

G. Thermal conductivity: According to JIS R-2616, expressed in terms of Kcal/m·hr·° C.

H. Cell size: The size of the cells in a fractured surface of the specimen is measured in terms of diameter in mm.

I. Heat resistance: The specimens are left to stand at 500° C in a furnace for 24 hours and are thereafter checked for deformation. The specimens free of any deformation are evaluated as "−", and those deformed are evaluated as "+".

J. Flame resistance: The specimens are exposed directly to flames for 10 seconds and then checked for deformation. The deformed specimens are evaluated as "+", and those free of any deformation as "−".

EXAMPLE 1

A 100 g quntity of aqueous solution of salt No. B 101 serving as the component (a) and having a pH of 1.4 at 25° C is placed in a 1.5-liter polyethylene container.

A 100 g quantity of basic powder No. D201 serving as the component (b), 3 g of blowing agent No. 301 serving as the component (c) and 3 g of stabilizer No. 401 as the component (d) are mixed together to obtain a powder mixture. The mixture is placed into the polyethylene container containing the salt No. B101, and the resulting mixture is stirred to prepare a uniform paste. When the paste is thereafter left to stand within the container, the paste foams progressively, and the foaming is completed in about 8 minutes after the stirring. While foaming, part of the paste (about 1 poise, at 25° C) overflows from the container. Subsequently, the contents of the container are left to stand for 1 day and is thereby completely hardened to obtain an inorganic foamed body, the properties of which are given in Table 7.

Specimens of inorganic foamed bodies No. 2 to No. 13 are prepared in the same manner as above except that in place of the salt No. B101 used as the component (b), 100 g quantities respectively of the aqueous solutions of the salts or mixtures of aqueous solutions of the salts and aqueous solutions of the acids given in Table 7 are used. The foaming time and properties of the specimens are also given in Table 7.

Table 7

| Specimen No. | Component (a) | Foaming time (minute) | (A) | (B) | (C) | (D) | (E) | (F) | (G) | (H) | (I) | (J) |
|---|---|---|---|---|---|---|---|---|---|---|---|---|
| 1 | B101 | 8 | 0.14 | 0.2 | 5 | — | — | — | 0.07 | 2 − 4 | — | — |
| 2 | B102 | 8 | 0.15 | 0.1 | 5.2 | — | — | — | 0.06 | 1 − 3 | — | — |
| 3 | B103 | 10 | 0.18 | 0.1 | 4.5 | — | — | — | 0.05 | 1 − 2 | — | — |
| 4 | B104 | 7 | 0.22 | 0.2 | 4.5 | — | — | — | 0.07 | 1 − 4 | — | — |
| 5 | B101 + A101 (4 : 1) | 9 | 0.17 | 0.2 | 5.0 | — | — | — | 0.07 | 1 − 3 | — | — |
| 6 | B101 + A103 (4 : 1) | 8 | 0.14 | 0.3 | 4.7 | — | — | — | 0.08 | 1 − 3 | — | — |
| 7 | B101 + A105 (4 : 1) | 9 | 0.18 | 0.2 | 5.2 | — | — | — | 0.07 | 1 − 5 | — | — |
| 8 | B101 + A107 (9 : 1) | 7 | 0.19 | 0.4 | 4.5 | — | — | — | 0.06 | 2 − 5 | — | — |
| 9 | B101 + A101 (9 : 1) | 9 | 0.18 | 0.5 | 4.2 | — | — | — | 0.09 | 1 − 5 | — | — |
| 10 | B101 + A111 (9 : 1) | 8 | 0.14 | 0.3 | 5.0 | — | — | — | 0.05 | 1 − 3 | — | — |
| 11 | B102 + A101 (9 : 1) | 8 | 0.13 | 0.2 | 5.2 | — | — | — | 0.06 | 1 − 2 | — | — |
| 12 | B103 + A101 (9 : 1) | 7 | 0.16 | 0.1 | 5.0 | — | — | — | 0.07 | 1 − 3 | — | — |
| 13 | B104 + A101 (9 : 1) | 8 | 0.15 | 0.3 | 5.2 | — | — | — | 0.07 | 1 − 3 | — | — |

EXAMPLE 2

Specimens of inorganic foamed bodies No. 14 to No. 27 are prepared in the same manner as in Example 1 except that in place of the salt No. D201 used as the component (b), 100 g quantities respectively of the salts and mixtures of the salts and acids given in Table 8 are used. Table 8 shows the foaming time and properties of the specimens.

Table 8

| Specimen No. | Component (b) | Foaming time (minute) | (A) | (B) | (C) | (D) | (E) | (F) | (G) | (H) | (I) | (J) |
|---|---|---|---|---|---|---|---|---|---|---|---|---|
| 14 | D202 | 7 | 0.21 | 0.9 | 4.2 | — | — | — | 0.09 | 2 − 5 | — | — |
| 15 | D203 | 9 | 0.21 | 0.7 | 4.5 | — | — | — | 0.10 | 1 − 7 | — | — |
| 16 | D204 | 8 | 0.20 | 0.7 | 3.7 | — | — | — | 0.10 | 2 − 5 | — | — |
| 17 | D205 | 8 | 0.18 | 0.8 | 5.0 | — | — | — | 0.07 | 1 − 5 | — | — |
| 18 | D206 | 7 | 0.16 | 0.2 | 4.5 | — | — | — | 0.06 | 1 − 3 | — | — |
| 19 | D207 | 10 | 0.17 | 0.5 | 5.2 | — | — | — | 0.03 | 1 − 3 | — | — |
| 20 | D208 | 8 | 0.15 | 0.1 | 6.2 | — | — | — | 0.06 | 1 − 3 | — | — |
| 21 | D209 | 9 | 0.16 | 0.1 | 6.0 | — | — | — | 0.06 | 1 − 2 | — | — |
| 22 | D210 | 8 | 0.18 | 0.3 | 5.0 | — | — | — | 0.09 | 2 − 4 | — | — |
| 23 | D211 | 9 | 0.17 | 0.4 | 4.7 | — | — | — | 0.08 | 1 − 4 | — | — |
| 24 | D212 | 8 | 0.19 | 0.4 | 5.2 | — | — | — | 0.09 | 1 − 5 | — | — |
| 25 | D201 + C201 (4 : 1) | 9 | 0.15 | 0.2 | 5.0 | — | — | — | 0.06 | 1 − 3 | — | — |
| 26 | D204 + C204 (9 : 1) | 10 | 0.14 | 0.4 | 6.0 | — | — | — | 0.07 | 1 − 3 | — | — |
| 27 | D211 + C201 (7 : 3) | 8 | 0.13 | 0.3 | 5.0 | — | — | — | 0.07 | 1 − 4 | — | — |

EXAMPLE 3

Specimens of inorganic foamed bodies No. 28 to No. 32 are prepared in the same manner as in Example 1 except that in place of the salt No. B101 used as the component (a) and the basic powder No. D201 used as the component (b), the mixtures and mixed powders given in Table 9 are used. Table 9 shows the foaming time and properties of the specimens.

Table 9

| Specimen No. | Component (a) | Component (b) | Foaming time (minute) | (A) | (B) | (C) | (D) | (E) | (F) | (G) | (H) | (I) | (J) |
|---|---|---|---|---|---|---|---|---|---|---|---|---|---|
| 28 | B101 + A101 (4 : 1) | D202 + C201 (4 : 1) | 8 | 0.17 | 0.4 | 5.7 | — | — | — | 0.06 | 1 – 3 | — | — |
| 29 | B104 + A101 (9 : 1) | D203 + C202 (9 : 1) | 8 | 0.16 | 0.2 | 5.2 | — | — | — | 0.06 | 1 – 4 | — | — |
| 30 | B101 + A111 (9 : 1) | D205 + C203 (7 : 3) | 9 | 0.13 | 0.4 | 5.0 | — | — | — | 0.06 | 1 – 3 | — | — |
| 31 | B101 + A107 (3 : 2) | D201 + C204 (9 : 1) | 7 | 0.18 | 0.4 | 5.7 | — | — | — | 0.07 | 1 – 3 | — | — |
| 32 | B102 + A111 (7 : 3) | D201 + C204 (7 : 3) | 9 | 0.20 | 0.1 | 6.0 | — | — | — | 0.07 | 1 – 3 | — | — |

EXAMPLE 4

Specimens of inorganic foamed bodies No. 33 to No. 36 are prepared in the same manner as in Example 1 except that in place of only the blowing agent No. 301 used as the component (c), 3 g quantities respectively of the blowing agents given in Table 10 are used. Specimens of inorganic foamed bodies No. 37 to No. 39 are prepared in the same manner as in Example 1 except that in place of only the stabilizer No. 401 used as the component (d), 3 g quantities respectively of the stabilizers given in Table 10 are used. Table 10 shows the foaming time and properties of the specimens.

Table 10

| Specimen No. | Component (c) or (d) | Foaming time (minute) | (A) | (B) | (C) | (D) | (E) | (F) | (G) | (H) | (I) | (J) |
|---|---|---|---|---|---|---|---|---|---|---|---|---|
| 33 | 302 | 8 | 0.19 | 0.3 | 4.5 | — | — | — | 0.06 | 1–3 | — | — |
| 34 | 304 | 7 | 0.14 | 0.2 | 5.2 | — | — | — | 0.05 | 1–4 | — | ' |
| 35 | 306 | 8 | 0.16 | 0.2 | 5.0 | — | — | — | 0.06 | 2–3 | — | — |
| 36 | 307 | 10 | 0.16 | 0.2 | 6.0 | — | — | — | 0.07 | 1–3 | — | — |
| 37 | 403 | 8 | 0.21 | 0.4 | 5.7 | — | — | — | 0.07 | 1–4 | — | — |
| 38 | 405 | 9 | 0.20 | 0.3 | 5.0 | — | — | — | 0.08 | 1–3 | — | — |
| 39 | 406 | 8 | 0.17 | 0.5 | 4.7 | — | — | — | 0.07 | 1–3 | — | — |

EXAMPLE 5

Inorganic foamed bodies are prepared in the same manner as in Example 1 except that the components (a) to (d) used in Example 1, the substances listed in Table 12 are used. The kinds and amounts of the components (a) to (d) used are shown in Table 11. Table 12 gives the properties and foaming time of the specimens obtained.

Table 11

| Specimen No. | Component (a) | Component (b) | Component (c) | Component (d) |
|---|---|---|---|---|
| 40 | B101 (50g) | D201 (150g) | 307 (5g) | 401 (45g) |
| 41 | B101 (800g) | D201 (150g) | 307 (10g) | 401 (20g) |
| 42 | B101 (400g) | D201 (150g) | 307 (25g) | 401 (5g) |
| 43 | B101 (100g) | D208 (140g) | 301 (15g) | 405 (3g) |
| 44 | B101 (100g) | D208 (140g) | 301 (10g) | 405 (15g) |
| 45 | B101 (100g) | D208 (140g) | 301 (8g) | 401 (23g) |
| 46 | B101 (5g) | D201 (150g) | 301 (10g) | 401 (20g) |
| 47 | B101 (1500g) | D201 (150g) | 301 (10g) | 401 (20g) |
| 48 | B101 (200g) | D201 (150g) | — | 401 (30g) |
| 49 | B101 (200g) | D201 (105g) | 301 (10g) | — |
| 50 | B101 (200g) | D201 (150g) | 301 (0.5g) | 401 (30g) |

Table 12

| Specimen No. | Foaming time (minute) | (A) | (C) | (F) | (G) | (H) |
|---|---|---|---|---|---|---|
| 40 | 8 | 0.22 | 4.5 | — | 0.12 | 1 — 3 |
| 41 | 9 | 0.13 | 4.2 | — | 0.04 | 1 – 5 |
| 42 | 8 | 0.14 | 4.2 | — | 0.05 | 2 – 5 |
| 43 | 10 | 0.16 | 5.2 | — | 0.08 | 1 – 13 |
| 44 | 7 | 0.18 | 6.0 | — | 0.07 | 1 – 4 |
| 45 | 8 | 0117 | 5.7 | — | 0.08 | 1 – 3 |
| 46 | No foaming, nonmeasurable | | | No foaming, nonmeasurable | | |
| 47 | Turned to a liquid, non-foamable and nonmeasurable | | | Turned to a liquid, non-foamable and nonmearsurable | | |
| 48 | No foaming, nonmeasurable | | | No foaming, nonmeasurable | | |
| 49 | 7 | 0.11 | 0.1 | — | 0.31 | 2 – 15 |
| 50 | Hardly any foaming | | | Harldy any foaming | | |

EXAMPLE 6

A 100 g quantity of aqueous solution of salt No. B101 serving as the component (a) and having a pH of 1.4 at 25° C is placed in a 1.5-liter polyethylene container.

A 40 g quantity of basic powder No. C201 and a 20 g of basic powder No. D201 serving as the component (b), 3 g of blowing agent No. 301 serving as the component (c) and 3 g of stabilizer No. 401 as the component (d) are mixed together to obtain a powder mixture. The mixture is placed into the polyethylene container containing the salt No. B101, and the resulting mixture is stirred to prepare a uniform paste. When the paste is thereafter left to stand within the container, the paste foams progressively, and the foaming is completed in about 8 minutes after the stirring. While foaming, part of the paste overflows from the container. Subsequently, the contents of the container are left to stand for one day and is thereby completely hardened to obtain an inorganic foamed body, the properties of which are given in Table 13.

Specimens of inorganic foamed bodies No. 52 to No. 54 are prepared in the same manner as above except that in place of the salt No. B101 used as the component (a), 100 g quantities respectively of the aqueous solutions of the salts or mixtures of aqueous solutions of the salts and aqueous solutions of the acids given in Table 13 are used. The foaming time and properties of the specimens are also given in Table 13.

Table 13

| Specimen No. | Component (a) | Foaming time (minute) | (A) | (B) | (C) | (D) | (E) | (F) | (G) | (H) | (I) | (J) |
|---|---|---|---|---|---|---|---|---|---|---|---|---|
| 51 | B101 | 10 | 0.18 | 0.2 | 3.7 | — | — | — | 0.06 | 1 - 3 | — | — |
| 52 | B102 | 10 | 0.23 | 0.4 | 2.2 | — | ' | — | 0.08 | 1 - 4 | — | — |
| 53 | B103 | 9 | 0.21 | 0.2 | 2.4 | — | — | — | 0.07 | 2 - 4 | — | — |
| 54 | B104 | 11 | 0.23 | 01.4 | 2.5 | — | — | — | 0.07 | 1 - 3 | — | — |

EXAMPLE 7

Specimens of inorganic foamed bodies are prepared in the same manner as in Example 6 except that in place of the salt No. C201 and No. D201 used as the component (b), 60 g of a mixture of the salts given in Table 14 are used. Table 14 shows the foaming time and properties of the specimens.

Table 14

| Specimen No. | Component (b) | Foaming time (minute) | (A) | (B) | (C) | (D) | (E) | (F) | (G) | (H) | (I) | (J) |
|---|---|---|---|---|---|---|---|---|---|---|---|---|
| 55 | D202 | 6 | 0.20 | 0.5 | 2.3 | — | — | — | 0.07 | 1 - 3 | — | — |
| 56 | D205 | 9 | 0.19 | 0.8 | 2.2 | — | — | — | 0.06 | 1 - 4 | — | — |
| 57 | D208 | 6 | 0.18 | 0.5 | 2.9 | — | — | — | 0.08 | 1 - 4 | — | — |
| 58 | D201 + C201 (1:1) | 5 | 0.20 | 0.5 | 1.8 | — | — | — | 0.08 | 1 - 3 | — | — |
| 59 | D204 + C204 (1:1) | 11 | 0.22 | 0.6 | 1.9 | — | — | — | 0.08 | 1 - 3 | — | — |

EXAMPLE 8

Inorganic foamed bodies are prepared in the same manner as in Example 6 except that the components (a) to (d) used in Example 1, the substances listed in Table 15 are used. The kinds and amounts of the components (a) to (d) used are shown in Table 15. Table 16 gives the properties and foaming time of the specimens obtained.

Table 15

| Specimen No. | Component (a) | Component (b) | Component (c) | Component (d) |
|---|---|---|---|---|
| 60 | B101 (50g) | C201 +D201 (100g + 50g) | 301 (5g) | 405 (45g) |
| 61 | B101 (800g) | C20 + D202 (100g 30 50g) | 301 (10g) | 405 (20g) |
| 62 | B101 (400g) | C201 + D204 (120g + 30g) | 301 (25g) | 406 (5g) |
| 63 | B101 + A101 (90g + 10g) | C201 140g) | 301 (15g) | 401 (3g) |
| 64 | B102 + A104 (70g + 30g) | C202 (140g) | 301 (10g) | 402 (15g) |
| 65 | B102 + A104 (60g + 40g) | C204 + D208 (80g + 60g) | 301 (8g) | 403 (23g) |
| 66 | B101 (5g) | C201 + 30g) (120g + 30g) | 301 (10g) 10g) | 401 (20g) (20g) |
| 67 | B101 (1500g) | C201 + D201 100g + 50g) | 301 (10g) | 401 (20g) |

Table 15-continued

| Specimen No. | Component (a) | Component (b) | Component (c) | Component (d) |
|---|---|---|---|---|
| 68 | B101 (200g) | C20 + D202 (90g + 60g) | — | 401 (30g) |
| 69 | B101 + A101 (150g + 50g) | C201 (150g) | 301 (10g) | — |
| 70 | B102 + A104 (150g + 50g) | C204 (150g) | 301 (0.2g) | 401 (30g) |
| 71 | B102 + A104 (120g + 80g) | C204 + D201 (120g + 30g) | 301 (30g) | 401 (0.2g) |

Table 16

| Specimen No. | Foaming time (minute) | (A) | (C) | (F) | (G) | (H) |
|---|---|---|---|---|---|---|
| 50 | 10 | 0.23 | 2.5 | — | 0.08 | 1 — 4 |
| 61 | 11 | 0.19 | 1.9 | — | 0.10 | 2 - 5 |
| 62 | 9 | 0.21 | 2.2 | — | 0.07 | 1 - 3 |
| 63 | 11 | 0.22 | 2.5 | — | 0.08 | 1 - 3 |
| 64 | 9 | 0.23 | 2.1 | — | 0.08 | 1 - 4 |
| 65 | 10 | 0.19 | 2.3 | — | 0.09 | 1 - 3 |
| 66 | No foaming, nonmeasurable | | | No foaming, nonmeasurable | | |
| 67 | Turned to a liquid, nonfoamable and nonmeasurable | | | Turned to a liquid, non-foamable and nonmeasurable | | |
| 68 | No foaming, nonmeasurable | | | No foaming, nonmeasurable | | |
| 69 | 10 | 0.17 | 0.1 | + | 0.29 | 2 — 20 |
| 70 | Hardly any foaing | | | Hardly any foaming | | |
| 71 | 9 | 0.11 | 0 | — | 0.18 | 5 - 20 |

EXAMPLE 9

Inorganic foamed bodies are prepared in the same manner as in Example 1 except that in place of No. A101, the components (a) listed in Table 17 are used. Table 18 gives the properties and foaming time of the specimens.

Table 17

| Acid No. | pKa (25° C) | pH (25° C) | Acid | Preparation procedure |
|---|---|---|---|---|
| A113 | 2.5 | 1.0 | Alanine | Add water to 198 g of alanine to prepare 1l of solution. |
| A114 | 2.2 | 1.2 | Lysine | Add water to 136 g of lysine to prepare 1l of solution. |
| A115 | 4.8 | 2.2 | Acetic acid | Add water to 60 g of acetic acid to prepare 1l of solution. |
| A116 | 3.8 | 1.7 | Formic acid | Dilute A112 by water to 3 times folume of A112. |
| A117 | 6.5 | 4.8 | CArbonic acid | Add $CO_2$ to water to prepare 1l saturated solution. |

Table 18

| Acid | Foaming time (minute) | Properties | | | | | | | | | |
|---|---|---|---|---|---|---|---|---|---|---|---|
| | | (a) | (b) | (c) | 8d) | (e) | (f) | (g) | (h) | (i) | (j) |
| A113 | 12 | 0.4 | 0.9 | 1.9 | — | — | — | 0.09 | 1 — 4 | — | — |
| A114 | 11 | 0.21 | 1.1 | 2.0 | — | — | — | 0.10 | 1 - 4 | — | — |
| A115 | 32 | 0.52 | 13.0 | 5.2 | — | — | + | 0.23 | 1 -9 | — | — |
| A116 | 50 | 0.48 | 20.0 | 7.8 | — | — | + | 0.21 | 2 — 9 | — | — |
| A117 | 100 | 0.92 | 37.0 | 31.6 | — | — | * | 0.35 | 0.3 -0 1 | — | — |

EXAMPLE 10

Inorganic foamed bodies are prepared in the same manner as in Example 1 except that at least one of components (e) listed in Table 19 is further added to the four components (a) to (d). The kinds and amounts of the components (a) to (e) used are shown in Table 20. Table 21 gives the properties and foaming time.

Table 19

| 501 | Gypsum | $CaSO_4$ |
|---|---|---|
| 502 | " | $CaSO_4 \cdot \frac{1}{2}H_2O$ |
| 503 | " | $CaSO_4 \cdot 2H_2O$ |
| 504 | Water-soluble resin | Methyl cellulose |
| 505 | " | Sodium polyacrylte |
| 506 | " | Polyvinyl alcohol |
| 507 | Inorganic fibrous | Glass fiber |
| 508 | " | Rook wool |

Table 20

| No. | Component (a) | Component (b) | Component (c) | Component (d) | Component (e) |
|---|---|---|---|---|---|
| 72 | B101 100g | D201 150g | 305 2g | 405 7g | 501 10g |
| 73 | B101 100g | D201 150g | 305 2g | 405 8g | 502 10g |
| 74 | B101 100g | C201 150g | 301 3g | 405 7g | 503 10g |
| 75 | B101 100g | C201 10g | 305 2g | 405 7g | 502 50g |
| 76 | B101 100g | C201 150g | 305 2g | 405 8g | 502 50g |
| 77 | B101 100g | C201 150g | 305 2g | 405 9g | 503 50g |
| 78 | B101 100g | D201 150g | 307 2g | 405 10g | 504 5g |
| 79 | A101 80g | D201 150g | 301 3g | 405 8g | 505 2g |
| 80 | A101 80g | C201 150g | 301 3g | 401 5g | 506 2g |
| 81 | A108 80g | C201 150g | 303 2g | 401 5g | 507 10g |
| 82 | A108 80g | D201 150g | 303 2g | 401 5g | 508 5g |

Table 21

| Specimen No. | Foaming time (minute) | Properties | | | | | | | | | |
|---|---|---|---|---|---|---|---|---|---|---|---|
| | | (a) | (b) | (c) | (d) | (e) | (f) | (g) | (h) | (i) | (j) |
| 72 | 12 | 0.30 | 0.8 | 8.5 | — | — | — | 0.10 | 1 - 3 | — | — |
| 73 | 13 | 0.27 | 0.9 | 9.5 | — | — | — | 0.11 | 1 - 3 | — | — |
| 74 | 15 | 0.27 | 0.4 | 9.0 | — | — | — | 0.10 | 1 - 3 | — | — |
| 75 | 5 | 0.09 | 24.0 | 0.5 | + | + | — | 0.09 | 4 - 10 | + | — |
| 76 | 20 | 0.45 | 15.0 | 12.0 | — | + | — | 0.25 | 1 - 3 | — | — |
| 77 | 17 | 0.55 | 19.0 | 10.5 | — | + | + | 0.27 | 1 - 4 | — | — |
| 78 | 10 | 0.21 | 0.6 | 8.5 | — | — | — | 0.07 | 1 - 4 | — | — |
| 79 | 12 | 0.22 | 0.7 | 8.0 | — | — | — | 0.07 | 1 - 4 | — | — |
| 80 | 7 | 0.24 | 1.2 | 9.5 | — | — | — | 0.09 | 1 - 5 | — | — |
| 81 | 5 | 0.28 | 1.0 | 10.5 | — | — | — | 0.10 | 1 - 4 | — | — |
| 82 | 12 | 0.24 | 0.7 | 11.0 | — | — | — | 0.09 | 1 - 5 | — | — |

What we claim is:

1. A process for preparing a foamed body comprising steps of (1) mixing the following four components:
   a. an aqueous solution having a pH of up to 2.0 and containing at least one member selected from the group consisting of acids and water-soluble acidic phosphates,
   b. at least one member selected from the group consisting of cement materials and anhydrous alkali metal silicates,
   c. a metal blowing agent, and
   d. a foaming stabilizer
   in the proportion of about 10 to about 400 parts by weight of the component (a), 100 parts by weight of component (b) calculated as a metal oxide $M_2O$ or $M'O$ wherein M is alkali metal and M' is alkaline earth metal, about 0.5 to about 30 parts by weight of the component (c) and about 3 to about 50 parts by weight of the component (d), to obtain a pasty mixture, (2) shaping the resulting pasty mixture to a desired shaped mass and (3) leaving the shaped mass to stand to effect foaming, the acids having an electric dissociation constant (pKa) of up to 4.0 at 25° C, the foaming stabilizer being at least one member selected from the group consisting of activated carbon, zeolite, silica gel, carbon black, talc and mica.

2. A process according to claim 1 wherein said aqueous solution has a pH of up to 1.5.

3. A process according to claim 1 wherein said electric dissociation constant is from 0.3 to 1.5 at 25° C.

4. A process according to claim 3 wherein said acid comprises an inorganic acid.

5. A process according to claim 4 wherein said inorganic acid is selected from the group consisting of hydrochloric acid, sulfuric acid, sulfurous acid, nitric acid, nitrous acid, phosphoric acid and chromic acid.

6. A process according to claim 1, in which said aqueous solution comprises a solution of water-soluble acidic phosphate.

7. A process according to claim 6, in which said water-soluble acidic phosphate comprises acidic aluminum orthophosphate.

8. A process according to claim 1, in which said cement material comprises at least one member selected from the group consisting of aluminates and silicates of alkaline earth metal.

9. A process according to claim 1, in which said alkali metal silicate comprises at least one water glass represented by $Na_2O \cdot nSiO_2$ or $K_2O \cdot nSiO_2$, wherein $n$ is 2.0 to 4.0.

10. A process according to claim 1, in which said metal blowing agent is selected from the group consisting of metal elements of Groups IIIA, IIIB, IVA, IVB, VA and VB of the Periodic Table.

11. A process according to claim 1, wherein said metal blowing agent is selected from the group consisting of aluminum and zinc.

12. A process according to claim 1, in which said proportion is 100 parts by weight of the component (b) calculated as a metal oxide $M_2O$ or $M'O$ wherein M is alkali metal and M' is alkaline earth metal, about 20 to about 300 parts by weight of the component (a), about 1.0 to about 5.0 parts by weight of the component (c) and about 5 to about 10 parts by weight of the component (d).

13. A process according to claim 1, in which gypsum is mixed with said four components in an amount of 0.5 to 20 weight percent based on component (b).

14. A process according to claim 1 in which inorganic fibrous material is mixed with said four components in an amount of 0.5 to 20 weight percent based on component (b).

* * * * *